(12) United States Patent
Puiu et al.

(10) Patent No.: US 11,745,714 B2
(45) Date of Patent: Sep. 5, 2023

(54) SYSTEM FOR ELECTRONIC PARKING BRAKE ACTUATION (71) Applicant: GM GLOBAL TECHNOLOGY OPERATIONS LLC, Detroit, MI (US)

(72) Inventors: Dumitru Puiu, Sterling Heights, MI (US); Luiz Lopes Lima, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 219 days.

(21) Appl. No.: 17/226,229

(22) Filed: Apr. 9, 2021

(65) Prior Publication Data
US 2022/0324427 A1    Oct. 13, 2022

(51) Int. Cl.
| | | |
|---|---|---|
| *B60T 13/74* | (2006.01) | |
| *F16D 65/18* | (2006.01) | |
| *B60T 1/06* | (2006.01) | |
| *F16D 125/58* | (2012.01) | |
| *F16D 125/40* | (2012.01) | |
| *F16D 121/24* | (2012.01) | |

(52) U.S. Cl.
CPC ............ B60T 13/746 (2013.01); B60T 1/065 (2013.01); F16D 65/18 (2013.01); *B60T 2201/12* (2013.01); *F16D 2121/24* (2013.01); *F16D 2125/40* (2013.01); *F16D 2125/585* (2013.01)

(58) Field of Classification Search
CPC ...... B60T 13/746; B60T 13/741; B60T 1/065; F16D 65/18; F16D 2121/24; F16D 2125/40
See application file for complete search history.

(56) References Cited

U.S. PATENT DOCUMENTS

| | | | |
|---|---|---|---|
| 2014/0034430 A1* | 2/2014 | Fuse | F16D 65/567 188/72.4 |
| 2016/0355169 A1* | 12/2016 | Ohlig | B60T 13/741 |
| 2017/0241526 A1* | 8/2017 | Drennen | F16H 25/2228 |
| 2022/0024434 A1* | 1/2022 | Baek | F16D 55/226 |
| 2022/0235839 A1* | 7/2022 | Baek | F16D 55/226 |
| 2022/0242384 A1* | 8/2022 | Baek | F16D 66/026 |
| 2022/0260125 A1* | 8/2022 | Tarandek | F16D 65/567 |

* cited by examiner

Primary Examiner — Nicholas J Lane
(74) Attorney, Agent, or Firm — Quinn IP Law (57) ABSTRACT A two-stage actuation mechanism for a brake system includes a first lead screw having a first plurality of threads, a second lead screw having a second plurality of threads, a preloaded torsional spring, and an actuator assembly having an input shaft coupled with the preloaded torsional spring of the two-stage actuation mechanism. The preloaded torsional spring is configured to activate a first stage of movement of the two-stage actuation mechanism via rotation of the first lead screw. The size and pitch of each of the first and second lead screws are configured to minimize power consumption by the actuator assembly and satisfy a desired actuation time with a low current consumption and high actuator gear train ratio.

20 Claims, 6 Drawing Sheets

SYSTEM FOR ELECTRONIC PARKING BRAKE ACTUATION

INTRODUCTION

The present disclosure relates generally to electronic parking brake (EPB) actuation for a vehicle.

Park brakes (also known as "emergency brakes") have historically been manually actuated mechanical devices that were configured to pull a cable causing a mechanism to tighten the calipers of the rear brakes of a vehicle. The park brakes have traditionally been used to ensure that a vehicle does not roll out of position, for example, while parked on an incline.

Conventional electronic parking brakes (EPBs) cannot generate enough claiming load to hold the vehicle on severe or extreme grade levels at both gross vehicle weight (GVW) and gross combined vehicle weight (GCVW). Therefore, it would be desirable to achieve a desired clamping load with a faster actuation time while also reducing the number of components of the EPB system.

SUMMARY

Embodiments according to the present disclosure provide a number of advantages. For example, embodiments according to the present disclosure enable desired claiming loads of an electronic parking brake (EPB) system through the use of an actuator having a greater torque ratio without affecting the actuation time of the EPB system.

In one aspect of the present disclosure, an electronic parking brake system includes a caliper, a first brake pad and a second brake pad positioned on either side of a brake rotor and enclosed within the caliper, an apply piston enclosed within the caliper and configured to act on the first brake pad, and a two-stage actuation mechanism coupled with the apply piston. The two-stage actuation mechanism includes a first lead screw having a first plurality of threads, a second lead screw having a second plurality of threads, a preloaded torsional spring, and an actuator assembly having an input shaft coupled with the preloaded torsional spring of the two-stage actuation mechanism. The preloaded torsional spring is configured to activate a first stage of movement of the two-stage actuation mechanism via rotation of the first lead screw. The size and pitch of each of the first and second lead screws are configured to minimize power consumption by the actuator assembly and satisfy a desired actuation time with a low current consumption and high actuator gear train ratio.

In some aspects, the second lead screw has a smaller pitch than the first lead screw.

In some aspects, the two-stage actuation mechanism includes a self-adjusting mechanism to control the displacement of the apply piston within a predetermined travel distance.

In some aspects, the apply piston includes a groove formed in an exterior surface of the apply piston and the self-adjusting mechanism travels within the groove.

In some aspects, the groove has a width of approximately 4 mm.

In some aspects, the first lead screw is nested within the apply piston and the second lead screw is nested within the first lead screw such that the first lead screw, the second lead screw, and the apply piston translate along a longitudinal axis.

In some aspects, the first plurality of threads of the first lead screw engage with corresponding grooves in an interior surface of the apply piston and the second plurality of threads of the second lead screw engage with corresponding grooves in an interior surface of the first lead screw.

In some aspects, in the first stage of movement of the two-stage actuation mechanism, the first lead screw, via the preloaded torsional spring, rotates less than one hundred eighty (180) degrees to a first predetermined clamping load and in a second stage of movement of the two-stage actuation mechanism, the second lead screw provides additional clamping load.

In some aspects, the input shaft includes a slot and the preloaded torsional spring includes a first end that engages with the slot in a first configuration, and in the first configuration, the preloaded torsional spring transfers an input shaft torque from the actuator assembly to rotate the first lead screw through a predetermined angular travel.

In some aspects, the apply piston includes a notch and the first end of the preloaded torsional spring is radially directed from the slot in the input shaft to the notch in the apply piston to hold the preloaded torsional spring in a second configuration to prevent back-driving of the first lead screw and allow rotation of the second lead screw in a second stage of movement of the two-stage actuation mechanism.

In another aspect of the present disclosure, a two-stage actuation mechanism for a brake system having an apply piston configured to apply a brake pressure to a brake rotor includes a first lead screw having a first plurality of threads, a second lead screw having a second plurality of threads, a preloaded torsional spring, and an actuator assembly having an input shaft coupled with the preloaded torsional spring of the two-stage actuation mechanism. The preloaded torsional spring is configured to activate a first stage of movement of the two-stage actuation mechanism via rotation of the first lead screw. The size and pitch of each of the first and second lead screws are configured to minimize power consumption by the actuator assembly and satisfy a desired actuation time with a low current consumption and high actuator gear train ratio.

In some aspects, the second lead screw has a smaller pitch than the first lead screw.

In some aspects, the two-stage actuation mechanism further includes a self-adjusting mechanism to control the displacement of the apply piston within a predetermined travel distance.

In some aspects, the first lead screw is nested within the apply piston and the second lead screw is nested within the first lead screw such that the first lead screw, the second lead screw, and the apply piston translate along a longitudinal axis.

In some aspects, the first plurality of threads of the first lead screw engage with corresponding grooves in an interior surface of the apply piston and the second plurality of threads of the second lead screw engage with corresponding grooves in an interior surface of the first lead screw.

In some aspects, in the first stage of movement of the two-stage actuation mechanism, the first lead screw, via the preloaded torsional spring, rotates less than one hundred eighty (180) degrees to a first predetermined clamping load and in a second stage of movement of the two-stage actuation mechanism, the second lead screw provides additional clamping load.

In another aspect of the present disclosure, a brake system includes a caliper having an octagonal interior surface, a brake pad enclosed within the caliper, an apply piston configured to act on the brake pad, the apply piston enclosed within the caliper and configured to translate along a longitudinal axis, and a two-stage actuation mechanism coupled with the apply piston. The two-stage actuation mechanism includes a first lead screw having a first plurality of threads, a second lead screw having a second plurality of threads, a preloaded torsional spring, and an actuator assembly having an input shaft coupled with the preloaded torsional spring of the two-stage actuation mechanism. The preloaded torsional spring is configured to activate a first stage of movement of the two-stage actuation mechanism via rotation of the first lead screw. The size and pitch of each of the first and second lead screws are configured to minimize power consumption by the actuator assembly and satisfy a desired actuation time with a low current consumption and high actuator gear train ratio.

In some aspects, the apply piston includes a linear bearing positioned on an exterior surface of the apply piston and encircling at least a portion of the apply piston, the linear bearing including an octagonal bearing surface that interfaces with the octagonal interior surface of the caliper to prevent rotation of the apply piston.

In some aspects, the first plurality of threads of the first lead screw engage with corresponding grooves in an interior surface of the apply piston and the second plurality of threads of the second lead screw engage with corresponding grooves in an interior surface of the first lead screw.

In some aspects, in the first stage of movement of the two-stage actuation mechanism, the first lead screw, via the preloaded torsional spring, rotates less than one hundred eighty (180) degrees to a first predetermined clamping load and in a second stage of movement of the two-stage actuation mechanism, the second lead screw provides additional clamping load.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Current electronic parking brake (EPB) systems cannot generate the desired clamping loads to hold a vehicle on various grade levels at both gross vehicle weight (GVW) and gross combined vehicle weight (GCVW). Embodiments discussed herein incorporate a two-stage actuation system with two buttress lead screws actuated in series to generate the desired clamping load within the desired actuation time. In various embodiments, the two screws are connected with a preloaded torsional spring that activates the first stage until a certain predetermined clamping load is achieved. The second stage lead screw is used for load modulation.

Figure 1:
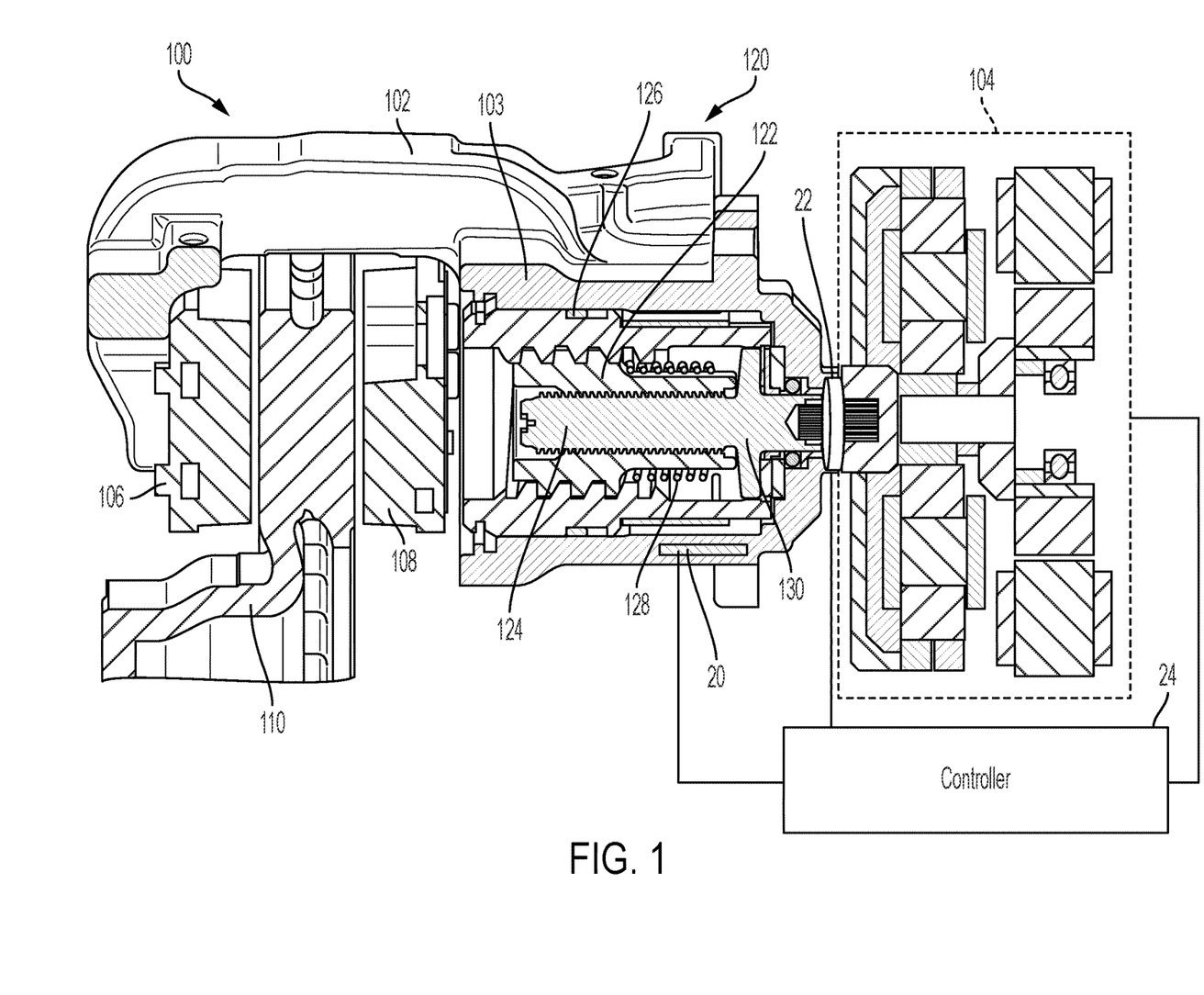
FIG. 1 is a schematic side cross-sectional view of an electronic parking brake system, according to an embodiment.
Figure 2:
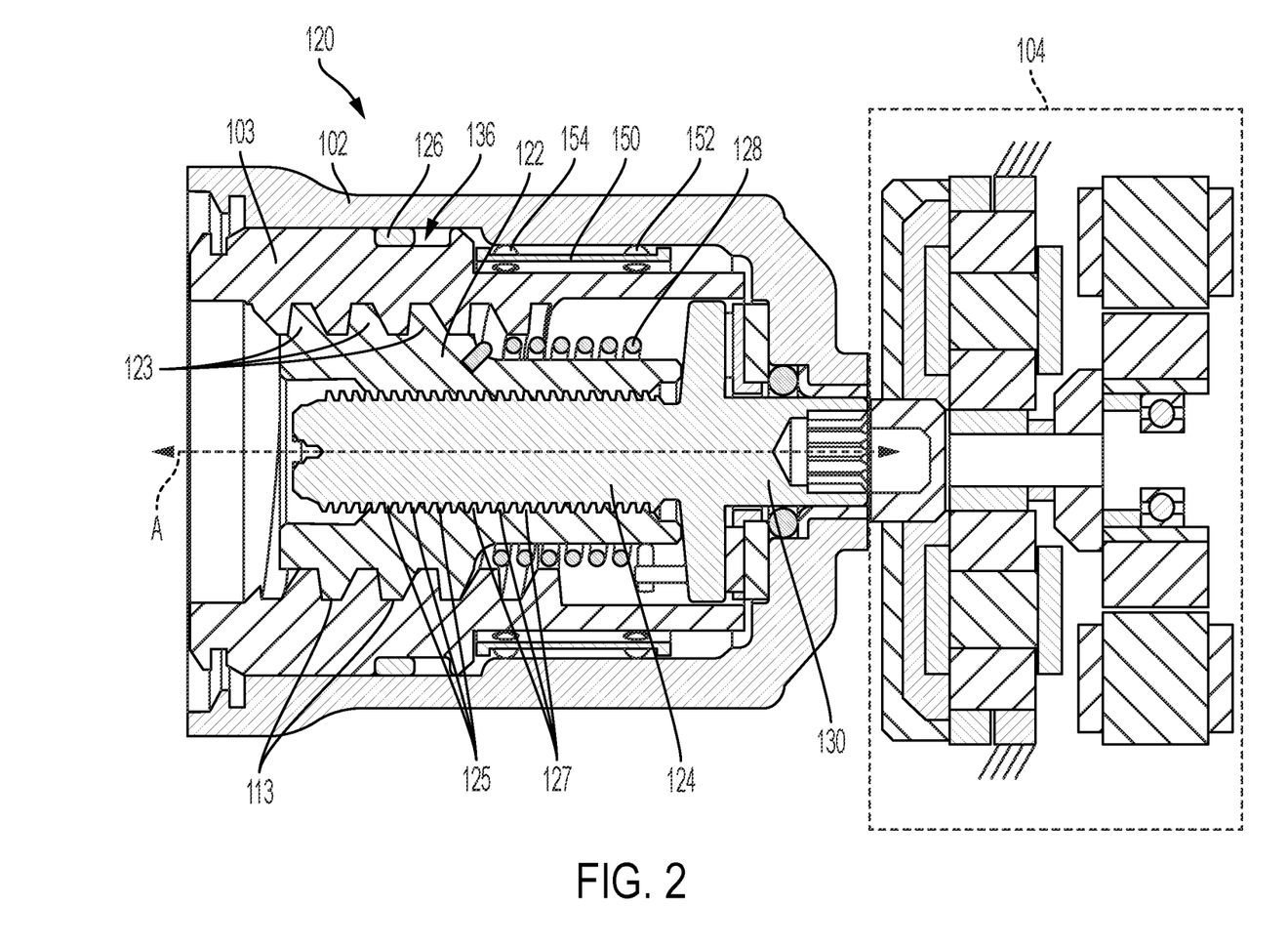
FIG. 2 is a schematic side cross-sectional view of a two-phase actuation system of the electronic parking brake system of FIG. 1, according to an embodiment.

FIGS. 1 and 2 illustrate an electronic parking brake (EPB) system 100, according to an embodiment. The EPB system 100 includes a two-stage actuation mechanism 120 and an actuator assembly 104. The EPB system 100 includes a caliper 102. The caliper 102 encloses a first brake pad 106 and a second brake pad 108 positioned on either side of a brake rotor 110. The caliper 102 also encloses an apply piston 103 and the two-stage actuation mechanism 120. The two-stage actuation mechanism 120 engages with the apply piston 103 to transfer the torque generated by the actuator assembly 104 to the brake pad 108. The apply piston 103 defines a longitudinal axis A along which the apply piston 103 translates due to actuation by the two-stage actuation mechanism 120, as discussed herein.

Figure 3:
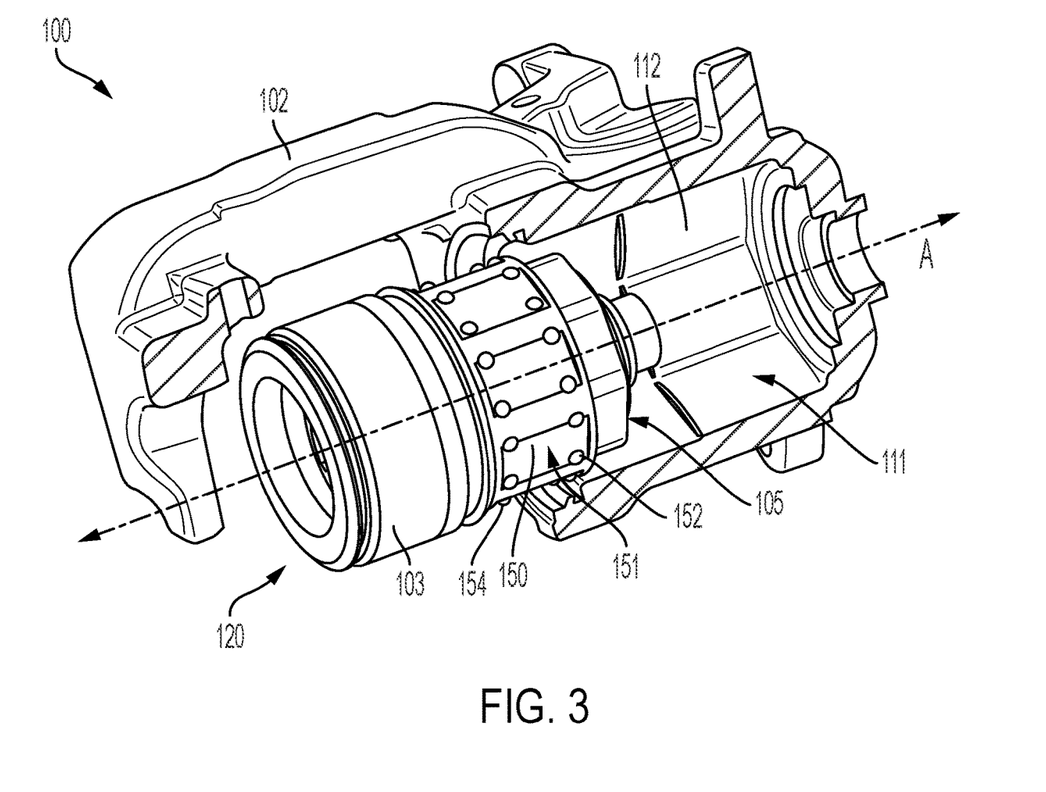
FIG. 3 is a schematic side partial perspective view of the caliper of the electronic parking brake system of FIG. 1, illustrating the apply piston and a linear bearing, according to an embodiment.

With reference to FIG. 3, the apply piston 103 includes a linear bearing 150. The linear bearing 150 is positioned on an exterior surface of the apply piston 103, encircling at least a portion of the apply piston 103, and includes a bearing surface 151. The bearing surface 151 is octagonal and interfaces with an octagonal interior surface 111 of the caliper 102. The linear bearing 150 also includes a plurality of bearing members 152, 154. In various embodiments, the bearing members 152, 154 are ball bearings. The apply piston 103 translates along the longitudinal axis A within the interior chamber 112 of the caliper 102. Rotation of the apply piston 103 is prevented due to the interface between the octagonal bearing surface 151 and the octagonal interior surface 111 of the interior chamber 112 of the caliper 102.

With continued reference to FIG. 1, in various embodiments, the EPB system 100 also includes an apply piston linear position sensor 20 and an actuator output shaft position sensor 22. Each of the sensors 20, 22 is in electronic communication with or under the control of at least one controller 24. While depicted as a single unit for illustrative purposes, the controller 24 may additionally include one or more other controllers, collectively referred to as a "controller." The controller 24 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 24 in controlling the vehicle.

In various embodiments, the controller 24 is also in electronic communication with the actuator assembly 104. In some embodiments, the controller 24 includes a motor controller and may be in combination with or in electronic communication with an onboard electronic control unit of the vehicle.

As shown in FIG. 2, the two-stage actuation mechanism 120 includes a first lead screw 122 and a second lead screw 124. The first lead screw 122 includes a plurality of threads 123 that engage with corresponding grooves 113 in an interior surface of the apply piston 103. Similarly, the second lead screw 124 includes a plurality of threads 125 that engage with corresponding grooves 127 in an interior surface of the first lead screw 122. The lead angles of the threads 123, 125 are designed to match the desire load profile for a desired actuation time. The second lead screw 124 has a smaller pitch than the first lead screw 122. In various embodiments, the second lead screw 124 is replaced with a ball screw and brushless motor for actuation, resulting in a smart electro-mechanical brake actuator.

In various embodiments, the second lead screw 124 is nested within the first lead screw 122 and the first lead screw 122 is nested within the apply piston 103. The second lead screw 124 further includes a shaft portion 130 that engages with the actuator assembly 104. The actuator assembly 104 features a high ratio reduction gear mechanism to further hold the clamping load at the actuation levels. The non-back-drivable threads 125 of the second lead screw 124 hold the clamping load of the apply piston 103 with no relaxation over time.

The first and second lead screws 122, 124 are connected with a preloaded torsional spring 128. The torsional spring 128 activates the first stage of movement of the two-stage actuation mechanism 120, that is the movement of the first lead screw 122, until a predetermined clamping load is achieved.

In various embodiments, the two-stage actuation mechanism 120 also includes a self-adjusting mechanism, such as a ring 126. The ring 126 controls the displacement of the apply piston 103 within a predetermined travel distance. Controlling the displacement of the apply piston 103 makes it insensitive to the wear of the components such as the brake pads 106, 108. As shown in FIGS. 1 and 2, the ring 126 translates within a groove 136 formed in an exterior surface of the apply piston 103. In various embodiments, the groove 136 has a width of approximately 4 mm. The self-adjusting mechanism resets only the position of the first lead screw 122 within the two-stage actuation mechanism 120 to account for wear of the components.

Figures 4, 5, 6:
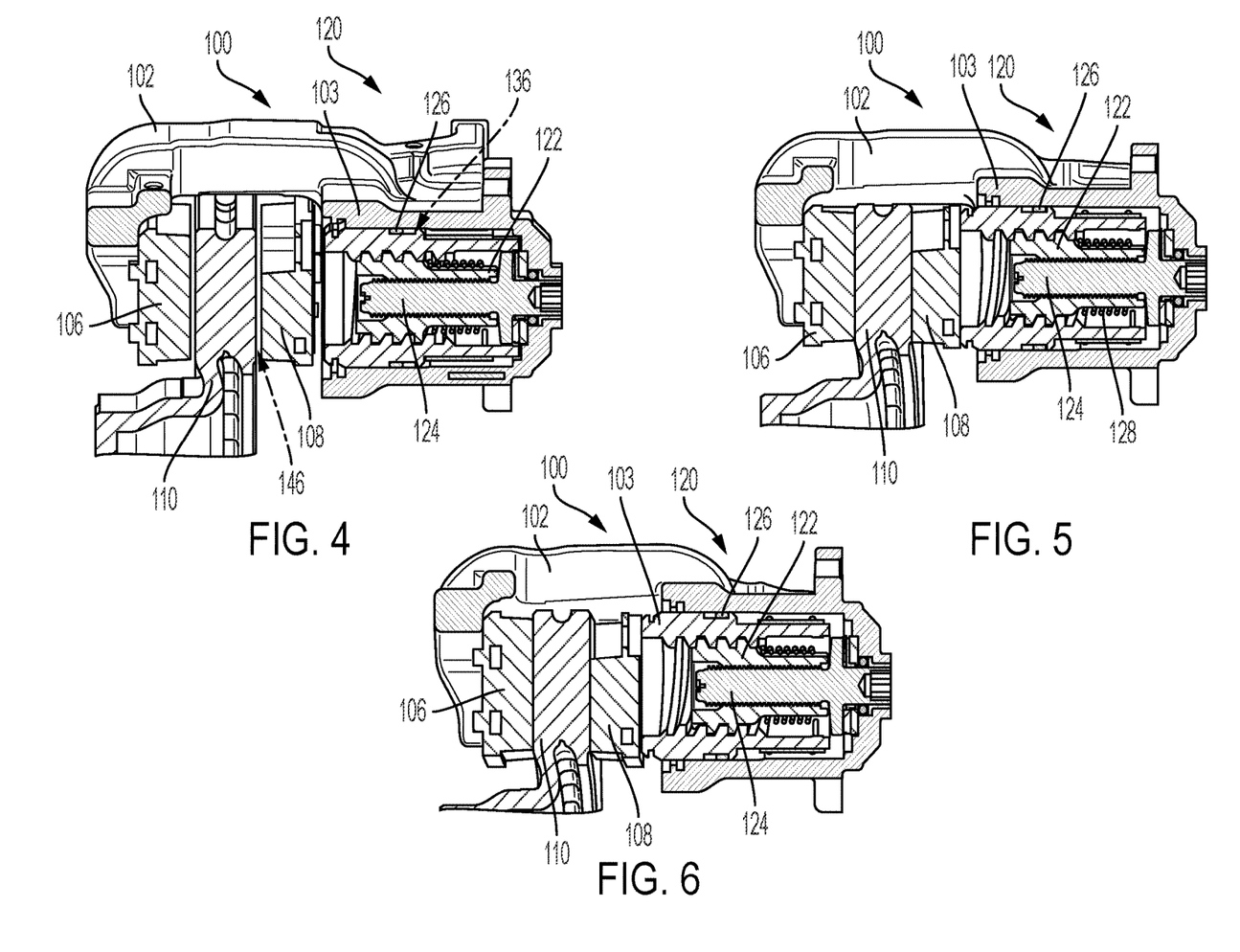
FIG. 4 is a schematic side cross-sectional view of an electronic parking brake system in a first position, according to an embodiment.
FIG. 5 is a schematic side cross-sectional view of an electronic parking brake system in a second position, according to an embodiment.
FIG. 6 is a schematic side cross-sectional view of an electronic parking brake system in a third position, according to an embodiment.

FIGS. 4-6 illustrate three stages of actuation of the two-stage actuation mechanism 120 of the EPB system 100. As discussed in greater detail herein, the engagement of the plurality of threads 123 of the first lead screw 122 with the corresponding grooves 113 in the apply piston 103 in a first stage of actuation and engagement of the plurality of threads 125 of the second lead screw 124 with the corresponding grooves 127 in the first lead screw 122 in a second stage of actuation translate the torque from the actuator assembly 104 to move the apply piston 103 toward the brake pads 106, 108 to apply a braking force on the brake rotor 110. The lead angles of the two screws are designed to match the load profile for a desired actuation time. In various embodiments, the actuation time is approximately 250 ms.

FIG. 4 illustrates the EPB system 100 in a disengaged position, that is the apply piston 103 is not applying a clamping load to the brake pad 108 and no braking is occurring. The ring 126 is positioned at one end of the groove 136 (in the illustrated embodiment, the left side or end of the groove 136). The ring 126 acts as a wear control mechanism to control the total amount of travel of the apply piston 103. In various embodiments, the width of the groove 136 is approximately 4 mm, thus limiting the travel of the apply piston 103 to approximately 4 mm. A gap 146 is maintained between the apply piston 103 and the brake pad 108 to limit unintentional wear of the components. The electrical actuation provided by the actuator assembly 104 allows the apply piston 103 to be fully retracted from the brake pad 108 to allow for greater running clearance and avoiding dragging torque on the disk brake.

When brake actuation is commanded, as shown in FIG. 5, the first lead screw 122, connected to the input shaft 130 via the torsional spring 128, provides the first stage of actuation. The first lead screw 122 rotates less than 180 degrees to close the gap 146 between the apply piston 103 and the brake pad 108. In various embodiments, the first lead screw 122 generates approximately 250 N of clamping load.

Next, in the second stage of actuation, shown in FIG. 6, the second lead screw 124 is activated when the torsional spring preload condition is almost overcome. The activation of the second lead screw 124, having a smaller pitch than the first lead screw 122, provides a greater clamping load of up to approximately 35 kN. The maximum clamping load of the EPB system 100 is achieved, in various embodiments, within one and a half rotations of the input shaft 130 of the actuator assembly 104.

Figure 7:
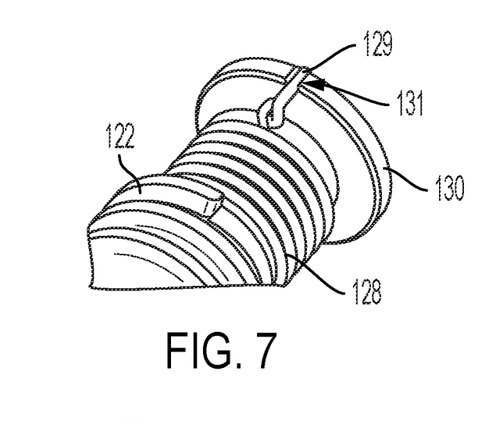
FIG. 7 is a schematic partial perspective view of a torsional spring component of a two-phase actuation system of an electronic parking brake system, according to an embodiment.

FIG. 7 illustrates the torsional spring 128 coupled with the input shaft 130. The torsional spring 128 includes a first end 129 that engages with a gap or slot 131 formed in the input shaft 130.

Figure 8:
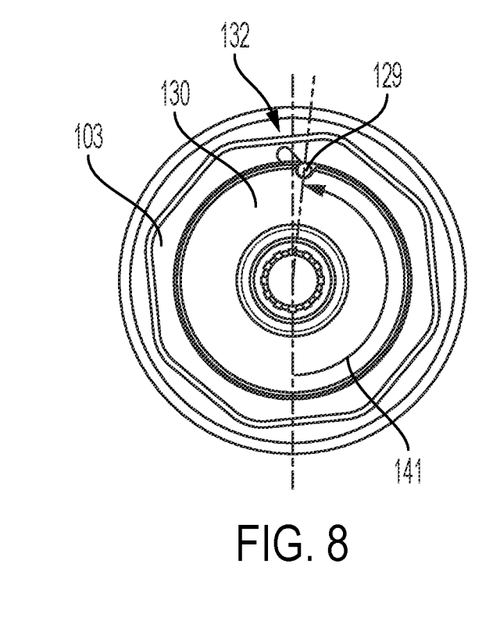
FIG. 8 is a schematic cross-sectional view of a shaft of the electronic parking brake system and the torsional spring in a first position, according to an embodiment.
Figure 9:
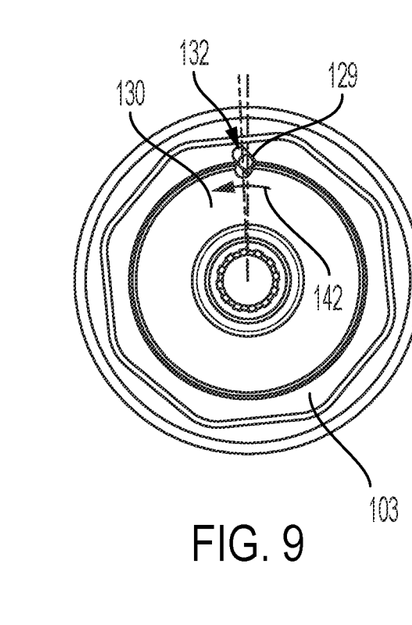
FIG. 9 is a schematic cross-sectional view of a shaft of the electronic parking brake system and the torsional spring in a second position, according to an embodiment.
Figure 10:
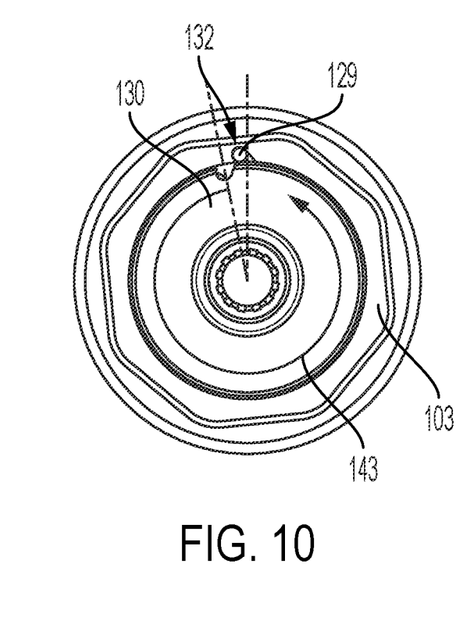
FIG. 10 is a schematic cross-sectional view of a shaft of the electronic parking brake system and the torsional spring in a third position, according to an embodiment.

FIGS. 8-10 illustrate the position of the first end 129 of the torsional spring 128 as the two-stage actuation mechanism 120 transitions from the first stage of actuation to the second stage of actuation. As shown in FIG. 8, the first end 129 of the torsional spring 128 is engaged with the input shaft 130 via the slot 131. During the initial application of braking torque from the actuator assembly 104, the preload of the torsional spring 128 will transfer the input shaft torque to the first lead screw 122 through a predetermined amount of angular travel (represented by the arrow 141), until the first end 129 of the torsional spring 128 reaches a position at which the transition to the second actuation stage begins.

The transition between the first stage of actuation and the second stage of actuation is shown in FIG. 9. As represented by the arrow 142, continued angular rotation of the input shaft 130 results in the first end 129 of the torsional spring 128 being pushed into a notch or groove 132 in the apply piston 103. The preload tension of the torsional spring 128 thus holds the first lead screw 122 in a preloaded position and prevents the first lead screw 122 from back-driving.

FIG. 10 illustrates the second stage of actuation. As illustrated, the first end 129 of the torsional spring 128 is fully seated within the notch 132 in the apply piston 103. Continued rotation of the input shaft 130 results in actuation of the second lead screw 124. The second lead screw 124 provides load modulation and additional clamping force through a small displacement distance.

The EPB system 100 and the two-stage actuation mechanism 120 discussed herein may be used on the rear wheels of a vehicle as a means for immobilizing the vehicle. In various embodiments, the EPB system 100 and the two-stage actuation mechanism 120 is used on the wheels at all four corners of the vehicle, depending on the weight and type of the vehicle.

In various embodiments, the first and second lead screws 122, 124 are configured (size and pitch) to minimize power consumption by the actuator assembly 104 while also insuring the EPB system 100 satisfies the desired actuation time with a low current consumption and the highest possible actuator gear train ratio. In various embodiments, the torsional spring 128 preload and rate are configured, in conjunction with the lead angles of the first and second lead screws 122, 124, to achieve a maximum possible actuation time over the air gap and insure a minimum clamping load.

Figure 11:
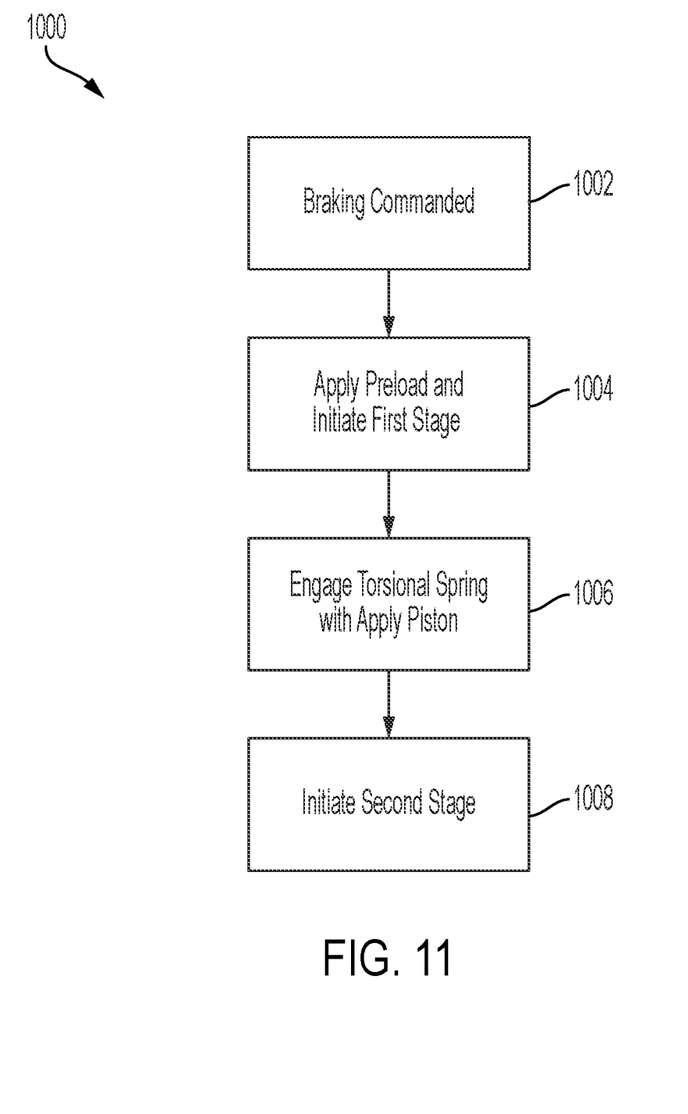
FIG. 11 is a flowchart of a method to actuate an electromechanical electronic parking brake system with two-stage actuation, according to an embodiment.

FIG. 11 illustrates a method 1000 to actuate an electromechanical EPB system with two-stage actuation, according to an embodiment. The method 1000 can be utilized in connection with the EPB system 100 and two-stage actuation mechanism 120 discussed herein. The method 1000 can be utilized in connection with the controller 24 as discussed herein, or by other systems associated with or separate from the vehicle, in accordance with exemplary embodiments. The order of operation of the method 1000 is not limited to the sequential execution as illustrated in FIG. 11, but may be performed in one or more varying orders, or steps may be performed simultaneously, as applicable in accordance with the present disclosure.

Beginning at 1002, a braking command is received by the controller 24. In various embodiments, the braking command is operator-initiated, such as through selection of an electronic parking brake engagement or is generated by any controller of the vehicle that initiates a braking feature of the vehicle. Next, at 1004, the preload of the torsional spring 128 is applied. The preload is applied when the actuator assembly 104 receives an actuation instruction or signal from the controller 24. The preload transfers the input shaft torque from the actuator assembly 104 to the first lead screw 122 for a predetermined angular travel. The preload initiates rotation of the first lead screw 122 to quickly translate the apply piston 103 and reduce and/or eliminate the gap 146 at low load.

Next, at 1006, the torsional spring 128 engages with the apply piston 103 to hold the first stage in the preloaded position and prevent the first lead screw 122 from back-driving. The engagement of the torsional spring 128 with the apply piston 103 occurs after a predetermined amount of angular travel of the input shaft 130. Finally, at 1008, the second stage is initiated through rotation of the second lead screw 124 that transfers additional torque from the actuator assembly 104 and provides load modulation and additional clamping force.

In various embodiments, throughout the various steps 1002, 1004, 1006, 1008 of the method 1000, the controller 24 receives sensor data from the apply piston linear position sensor 20 and the actuator output shaft position sensor 22. The data received from one or both of the sensors 20, 22 is used by the controller 24 to control actuation of the actuator assembly 104.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes, and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components. Such example devices may be onboard as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electronic parking brake system, comprising:
a caliper;
a first brake pad and a second brake pad positioned on either side of a brake rotor and enclosed within the caliper;
an apply piston enclosed within the caliper and configured to act on the first brake pad; and
a two-stage actuation mechanism coupled with the apply piston, the two-stage actuation mechanism comprising:
a first lead screw having a first plurality of threads;
a second lead screw having a second plurality of threads;
a preloaded torsional spring; and
an actuator assembly having an input shaft coupled with the preloaded torsional spring of the two-stage actuation mechanism;
wherein the preloaded torsional spring is configured to activate a first stage of movement of the two-stage actuation mechanism via rotation of the first lead screw and a size and a pitch of each of the first and second lead screws are configured to minimize power consumption by the actuator assembly and satisfy a desired actuation time.

2. The electronic parking brake system of claim 1, wherein the second lead screw has a smaller pitch than the first lead screw.

3. The electronic parking brake system of claim 1, wherein the two-stage actuation mechanism includes a self-adjusting mechanism to control a displacement of the apply piston within a predetermined travel distance.

4. The electronic parking brake system of claim 3, wherein the apply piston includes a groove formed in an exterior surface of the apply piston and the self-adjusting mechanism travels within the groove.

5. The electronic parking brake system of claim 4, wherein the groove has a width of approximately 4 mm.

6. The electronic parking brake system of claim 1, wherein the first lead screw is nested within the apply piston and the second lead screw is nested within the first lead screw such that the first lead screw, the second lead screw, and the apply piston translate along a longitudinal axis.

7. The electronic parking brake system of claim 1, wherein the first plurality of threads of the first lead screw engage with corresponding grooves in an interior surface of the apply piston and the second plurality of threads of the second lead screw engage with corresponding grooves in an interior surface of the first lead screw.

8. The electronic parking brake system of claim 1, wherein in the first stage of movement of the two-stage actuation mechanism, the first lead screw, via the preloaded torsional spring, rotates less than one hundred eighty (180) degrees to a first predetermined clamping load and in a second stage of movement of the two-stage actuation mechanism, the second lead screw provides additional clamping load.

9. The electronic parking brake system of claim 1, wherein the input shaft includes a slot and the preloaded torsional spring includes a first end that engages with the slot in a first configuration, and in the first configuration, the preloaded torsional spring transfers an input shaft torque from the actuator assembly to rotate the first lead screw through a predetermined angular travel.

10. The electronic parking brake system of claim 9, wherein the apply piston includes a notch and the first end of the preloaded torsional spring is radially directed from the slot in the input shaft to the notch in the apply piston to hold the preloaded torsional spring in a second configuration to prevent back-driving of the first lead screw and allow rotation of the second lead screw in a second stage of movement of the two-stage actuation mechanism.

11. A two-stage actuation mechanism for a brake system having an apply piston configured to apply a brake pressure to a brake rotor, the two-stage actuation mechanism comprising:
   a first lead screw having a first plurality of threads;
   a second lead screw having a second plurality of threads;
   a preloaded torsional spring; and
   an actuator assembly having an input shaft coupled with the preloaded torsional spring of the two-stage actuation mechanism;
   wherein the preloaded torsional spring is configured to activate a first stage of movement of the two-stage actuation mechanism via rotation of the first lead screw and a size and a pitch of each of the first and second lead screws are configured to minimize power consumption by the actuator assembly and satisfy a desired actuation time.

12. The two-stage actuation mechanism of claim 11, wherein the second lead screw has a smaller pitch than the first lead screw.

13. The two-stage actuation mechanism of claim 11 further comprising a self-adjusting mechanism to control a displacement of the apply piston within a predetermined travel distance.

14. The two-stage actuation mechanism of claim 11, wherein the first lead screw is nested within the apply piston and the second lead screw is nested within the first lead screw such that the first lead screw, the second lead screw, and the apply piston translate along a longitudinal axis.

15. The two-stage actuation mechanism of claim 11, wherein the first plurality of threads of the first lead screw engage with corresponding grooves in an interior surface of the apply piston and the second plurality of threads of the second lead screw engage with corresponding grooves in an interior surface of the first lead screw.

16. The two-stage actuation mechanism of claim 11, wherein in the first stage of movement of the two-stage actuation mechanism, the first lead screw, via the preloaded torsional spring, rotates less than one hundred eighty (180) degrees to a first predetermined clamping load and in a second stage of movement of the two-stage actuation mechanism, the second lead screw provides additional clamping load.

17. A brake system, comprising:
   a caliper having an octagonal interior surface;
   a brake pad enclosed within the caliper;
   an apply piston configured to act on the brake pad, the apply piston enclosed within the caliper and configured to translate along a longitudinal axis; and
   a two-stage actuation mechanism coupled with the apply piston, the two-stage actuation mechanism comprising:
      a first lead screw having a first plurality of threads;
      a second lead screw having a second plurality of threads;
      a preloaded torsional spring; and
      an actuator assembly having an input shaft coupled with the preloaded torsional spring of the two-stage actuation mechanism;
   wherein the preloaded torsional spring is configured to activate a first stage of movement of the two-stage actuation mechanism via rotation of the first lead screw and a size and a pitch of each of the first and second lead screws are configured to minimize power consumption by the actuator assembly and satisfy a desired actuation time.

18. The brake system of claim 17, wherein the apply piston includes a linear bearing positioned on an exterior surface of the apply piston and encircling at least a portion of the apply piston, the linear bearing including an octagonal bearing surface that interfaces with the octagonal interior surface of the caliper to prevent rotation of the apply piston.

19. The brake system of claim 17, wherein the first plurality of threads of the first lead screw engage with corresponding grooves in an interior surface of the apply piston and the second plurality of threads of the second lead screw engage with corresponding grooves in an interior surface of the first lead screw.

20. The brake system of claim 17, wherein in the first stage of movement of the two-stage actuation mechanism, the first lead screw, via the preloaded torsional spring, rotates less than one hundred eighty (180) degrees to a first predetermined clamping load and in a second stage of movement of the two-stage actuation mechanism, the second lead screw provides additional clamping load.

* * * * *